(12) United States Patent
Terriquez et al.

(10) Patent No.: US 12,371,169 B2
(45) Date of Patent: Jul. 29, 2025

(54) BASEFRAME CONNECTION WITH SIMULTANEOUS MOVEMENT IN LONGITUDINAL AND LATERAL DIRECTIONS

(71) Applicant: Safran Seats USA LLC, Gainesville, TX (US)

(72) Inventors: Gerardo Terriquez, Gainesville, TX (US); Jeronimo Rodriguez, Gainesville, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 18/280,768

(22) PCT Filed: Mar. 26, 2021

(86) PCT No.: PCT/US2021/024468
§ 371 (c)(1),
(2) Date: Sep. 7, 2023

(87) PCT Pub. No.: WO2022/203687
PCT Pub. Date: Sep. 29, 2022

(65) Prior Publication Data
US 2024/0150024 A1    May 9, 2024

(51) Int. Cl.
*B64D 11/06* (2006.01)
*B64D 11/00* (2006.01)

(52) U.S. Cl.
CPC ...... *B64D 11/0696* (2013.01); *B64D 11/0602* (2014.12); *B64D 11/0606* (2014.12); *B64D 11/0648* (2014.12); *B64D 2011/0046* (2013.01)

(58) Field of Classification Search
CPC .................. B64D 11/0648; B64D 11/0696
See application file for complete search history.

(56) References Cited

U.S. PATENT DOCUMENTS

| 2005/0072897 A1 | 4/2005 | Fanucci et al. |
| 2005/0180836 A1 | 8/2005 | Dowty |

(Continued)

FOREIGN PATENT DOCUMENTS

| DE | 8715256 U1 | 3/1988 |
| DE | 102018221183 B3 | 12/2019 |

(Continued)

OTHER PUBLICATIONS

International Patent Application No. PCT/US2021/024468, International Search Report and Written Opinion, dated Dec. 22, 2021.

(Continued)

*Primary Examiner* — Nicholas McFall
*Assistant Examiner* — Justin Michael Heston
(74) *Attorney, Agent, or Firm* — Kilpatrick Townsend & Stockton LLP

(57) ABSTRACT

Described are mounting assemblies for an item of aircraft furniture in an aircraft. The mounting assemblies each include a base, a first connector, and a second connector. The base includes a first slot elongated in a first direction and a second slot elongated in a second direction. The first connector is retained within and is movable within the first slot, and the second connector is retained within and is movable within the second slot. The first connector and the second connector may be simultaneously movable in the first direction and the second direction.

12 Claims, 5 Drawing Sheets

(56) References Cited

U.S. PATENT DOCUMENTS

| | | | |
|---|---|---|---|
| 2008/0185489 A1 | 8/2008 | Ehrgott | |
| 2016/0325837 A1* | 11/2016 | Erhel | B64D 11/06 |
| 2018/0043798 A1* | 2/2018 | Jacobson | B64D 11/0639 |
| 2019/0233119 A1* | 8/2019 | Oleson | B60N 2/143 |
| 2019/0389598 A1 | 12/2019 | Chua et al. | |
| 2023/0219690 A1* | 7/2023 | Bohannon | B64D 11/0639 |
| | | | 244/118.6 |

FOREIGN PATENT DOCUMENTS

| | | |
|---|---|---|
| EP | 3081491 B1 | 8/2019 |
| EP | 3374265 B1 | 9/2020 |

OTHER PUBLICATIONS

European Application No. 21719500.7, Office Action mailed on Feb. 7, 2025, 6 pages.

* cited by examiner

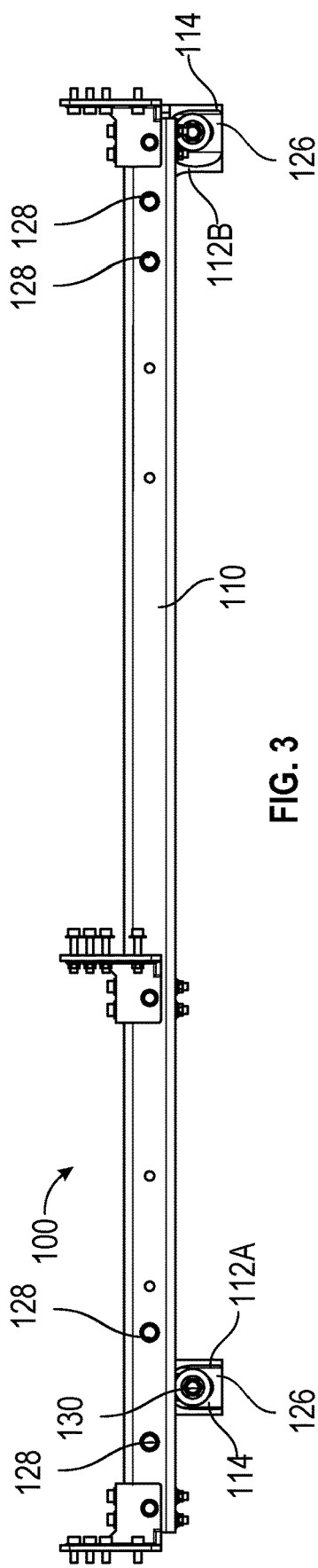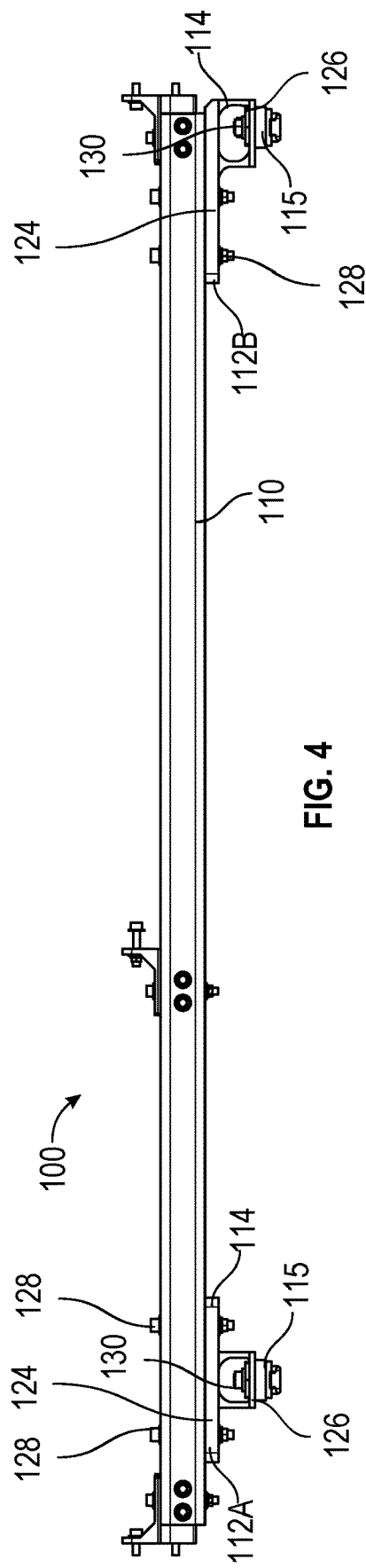

BASEFRAME CONNECTION WITH SIMULTANEOUS MOVEMENT IN LONGITUDINAL AND LATERAL DIRECTIONS

FIELD OF THE INVENTION

The field of the invention relates to items of aircraft furniture, and, more particularly, to mounting systems and assemblies for mounting aircraft furniture in an aircraft.

BACKGROUND

Aircraft furniture may be various types of structures or devices that are usually mounted to a floor of an aircraft. Aircraft furniture may include, but is not limited to, an aircraft seat, a cabinet or stowage compartment, a table, an aircraft interior monument, and/or a privacy module wall. Such structures or devices usually include one or more track fitting adapters that engage one or more mounting tracks in the floor of the aircraft to mount the item of aircraft furniture to the floor of the aircraft, and such connections are traditionally fixed. Deflections on the aircraft floor may occur during use, and such deflections may compromise the connection between the aircraft furniture and the mounting track such that the aircraft furniture becomes disengaged from the track and/or the aircraft furniture and/or track is damaged.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a mounting assembly is provided for mounting an item of aircraft furniture in an aircraft. The mounting assembly includes a mounting structure having a first slot elongated in a lateral direction and a second slot elongated in a longitudinal direction. The second slot may be offset from the first slot. A first connector is retained within the first slot and is movable in the lateral direction, and the first connector is adapted to connect with a base frame of the item of aircraft furniture. A second connector is retained within the second slot and is movable in the longitudinal direction, and the second connector is adapted to connect with a track fitting assembly.

In some embodiments, the first connector is slidable within the first slot and the second connector is slidable within the second slot. In various embodiments, the first slot is a first lateral slot and the first connector is a first base frame connector, and the mounting structure includes a second lateral slot elongated in the lateral direction. In some embodiments, the mounting assembly includes a second base frame connector adapted to connect to the base frame of the item of aircraft furniture, and the second base frame connector is movable in the lateral direction within the second lateral slot. In various embodiments, the second slot is between the first lateral slot and the second lateral slot in the lateral direction. In other embodiments, the second slot need not be between the first lateral slot and the second lateral slot in the lateral direction.

In certain embodiments, the first slot and the second slot are non-coplanar. In such embodiments, the second slot may optionally be vertically offset below the first slot. In other embodiments, the first slot and the second slot are coplanar. In various embodiments, the second slot extends forward or aft relative to the first slot. In other embodiments, the second slot need not extend forward or aft relative to the first slot, and the first slot and the second slot may be collinear.

In some embodiments, a vertical position of the first connector is fixed relative to the second connector via the mounting structure. In various embodiments, a length of the first slot is different from a length of the second slot; however, in other embodiments, the length of the first slot may be the same as the length of the second slot. In various embodiments, the mounting structure comprises a base. Optionally, the mounting structure may include a support extending from the base in a vertical direction. In some embodiments, the support may optionally be offset from the base in the longitudinal direction. In various cases, the base may define the first slot and the support may define the second slot, or vice versa. In certain embodiments, the first connector and the second connector are simultaneously movable in the longitudinal direction and the lateral direction.

A mounting system may include the mounting assembly, the base frame, and the track fitting assembly. In certain embodiments, an item of aircraft furniture may include the mounting system. Items of aircraft furniture that may include the mounting system include, but are not limited to, an aircraft seat, a cabinet or stowage compartment, a table, an aircraft interior monument, and/or a privacy module wall.

According to certain embodiments of the present invention, a mounting system for mounting an item of aircraft furniture in an aircraft includes a base frame, a track fitting assembly configured to engage a track in the aircraft, and a mounting assembly. The mounting assembly may include a mounting structure having a first slot elongated in a lateral direction and a second slot elongated in a longitudinal direction, a first connector connected to the base frame, and a second connector connected to the track fitting assembly. The first connector may be movable within the first slot in the lateral direction and the second connector may be movable within the second slot in the longitudinal direction such that the base frame is longitudinally and laterally movable relative to the track fitting assembly.

In certain embodiments, the first slot is a first lateral slot and the first connector is a first base frame connector, the mounting structure includes a second lateral slot elongated in the lateral direction, and the mounting assembly includes a second base frame connector connected to the base frame. The second base frame connector may be movable in the lateral direction within the second lateral slot. In some embodiments, the first slot and the second slot are non-coplanar.

According to certain embodiments of the present invention, a mounting assembly for mounting an item of aircraft furniture in an aircraft includes a base, a first connector, and a second connector. The base includes a first slot elongated in a first direction and a second slot elongated in a second direction. The first connector may be within the first slot and such that the first connector is movable in the first direction. The first connector may be connectable to a base frame of the item of aircraft furniture. The second connector may be within the second slot such that the second connector is movable in the second direction. The second connector may be connectable to a track fitting assembly. In various embodiments, the first connector and the second connector are simultaneously movable in the first direction and the second direction.

In various embodiments, a mounting system includes the mounting assembly, the base frame, and the track fitting assembly. In some embodiments, the first direction is a lateral direction and the second direction is a longitudinal direction.

BRIEF DESCRIPTION OF THE DRAWINGS

FIG. 3 is a top view of the mounting system of FIG. 2.

FIG. 4 is a front view of the mounting system of FIG. 2.

DETAILED DESCRIPTION

Figure 1:
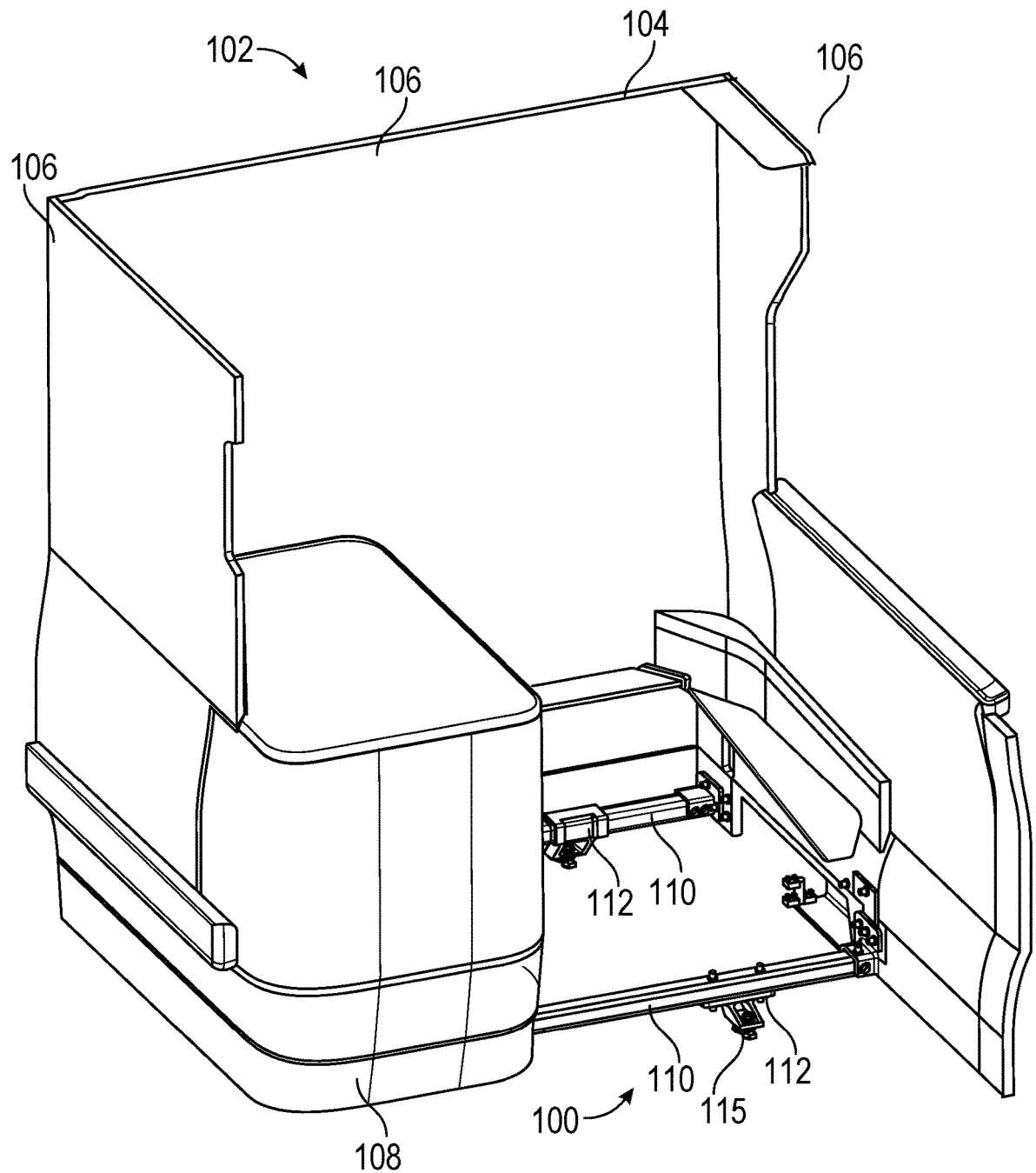
FIG. 1 is a perspective view of aircraft furniture with a mounting system according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Throughout this disclosure, a reference numeral with a letter refers to a specific instance of an element and the reference numeral letter without a letter refers to the element generically or collectively. Thus, as an example (not shown in the drawings), device "12A" refers to an instance of a device class, which may be referred to collectively as devices "12" and any one of which may be referred to generically as a device "12".

The described embodiments of the invention provide mounting systems and mounting assemblies for aircraft furniture, including but not limited to aircraft seats, tables, walls, cabinets or stowage compartments, an aircraft interior monument, and/or other structures that may be mounted to a mounting track. While the mounting systems and mounting assemblies are discussed for use with aircraft, they are by no means so limited. Rather, embodiments of the mounting systems and mounting assemblies may be used in other types of furniture or structures mounted to a track as desired.

According to certain embodiments of the present invention, as shown in FIG. 1, a mounting system 100 may be provided with one or more items of aircraft furniture 102 such that the aircraft furniture 102 can be mounted to a mounting track in the floor of an aircraft (not shown). Moreover, a particular item of aircraft furniture 102 may include more than one mounting system 100 as desired. As used herein, aircraft furniture 102 generally refers to any item or structure that may be desirable to mount to one or more mounting tracks in the floor of the aircraft. Some non-limiting examples of aircraft furniture 102 include, but are not limited to, an aircraft seat, a cabinet or stowage compartment, a table, an aircraft interior monument, a privacy module wall, combinations thereof, or other structures or items as desired. In the embodiment illustrated in FIG. 1, the aircraft furniture 102 includes a privacy module 104 having walls 106 and a cabinet or stowage compartment 108, among other features.

Figure 2:
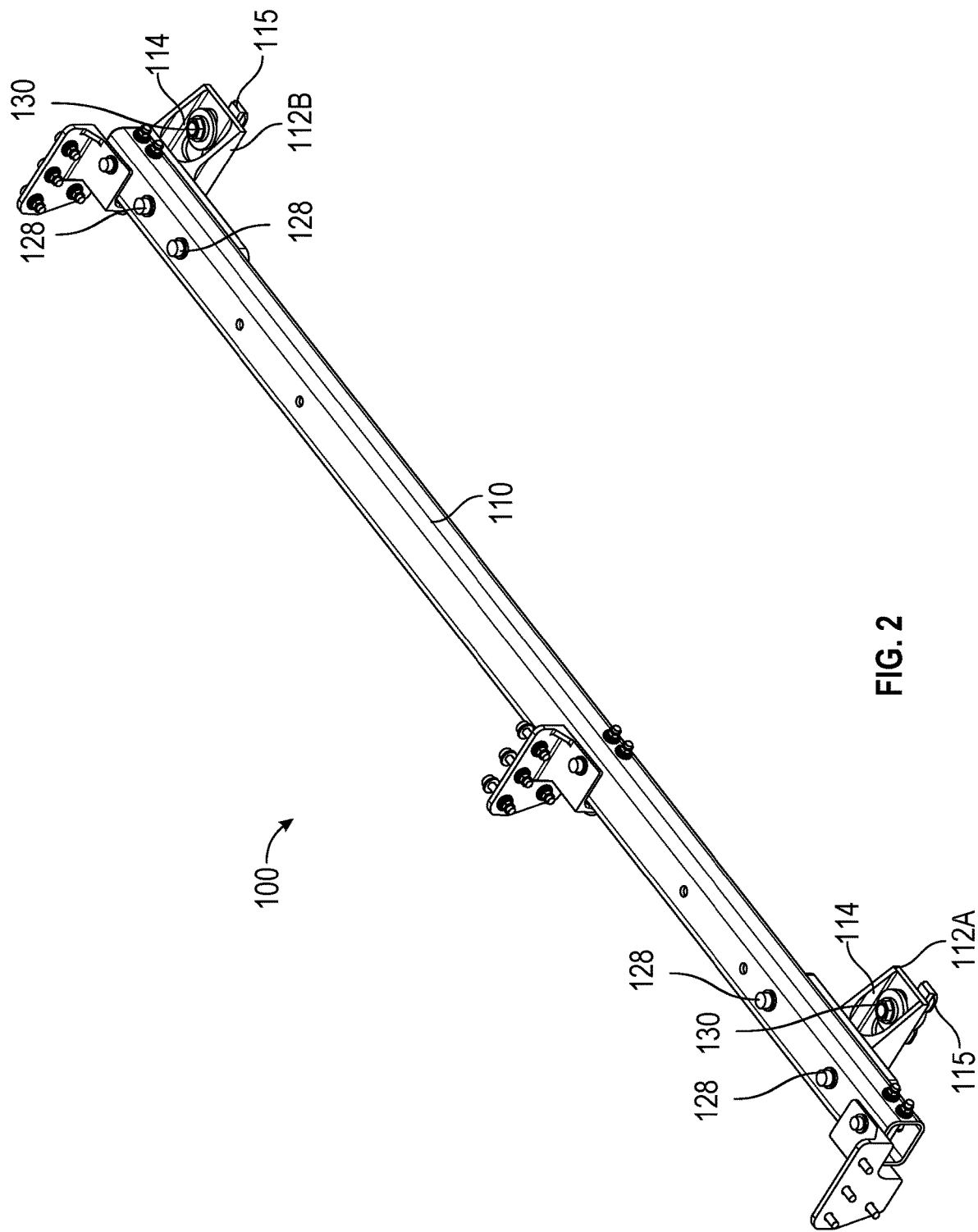
FIG. 2 is a perspective view of the mounting system of FIG. 1 with two mounting assemblies according to certain embodiments of the present invention.

As best illustrated in FIGS. 2-6, the mounting system 100 includes one or more base frames 110, at least one mounting assembly 112, and at least one track fitting assembly 115. In certain embodiments, and as illustrated in FIGS. 2-4, the base frame 110 may include a plurality of mounting assemblies 112 and/or a plurality of track fitting assemblies 115. The base frame 110 may be connected or otherwise attached to the aircraft furniture 102 via various devices or mechanisms as desired, including but not limited to mechanical fasteners such as bolts, pins, hooks, and the like, or other fasteners as desired. The track fitting assembly 115 includes one or more structures, including but not limited to studs, that may engage the mounting track in the floor of the aircraft. In various embodiments, the track fitting assembly 115 is adapted to provide a fixed connection with the mounting track, meaning that once the track fitting assembly 115 is engaged with the mounting track, the position and/or orientation of the track fitting assembly 115 relative to the mounting track is maintained.

Figure 5:
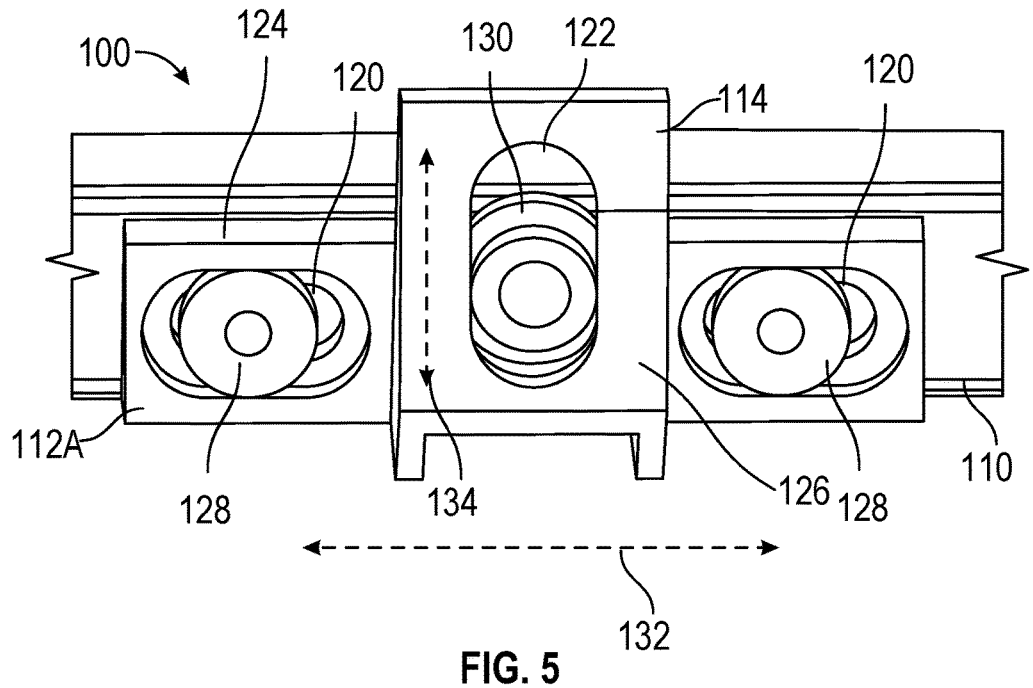
FIG. 5 is a bottom view of one of the mounting assemblies of FIG. 2.
Figure 6:
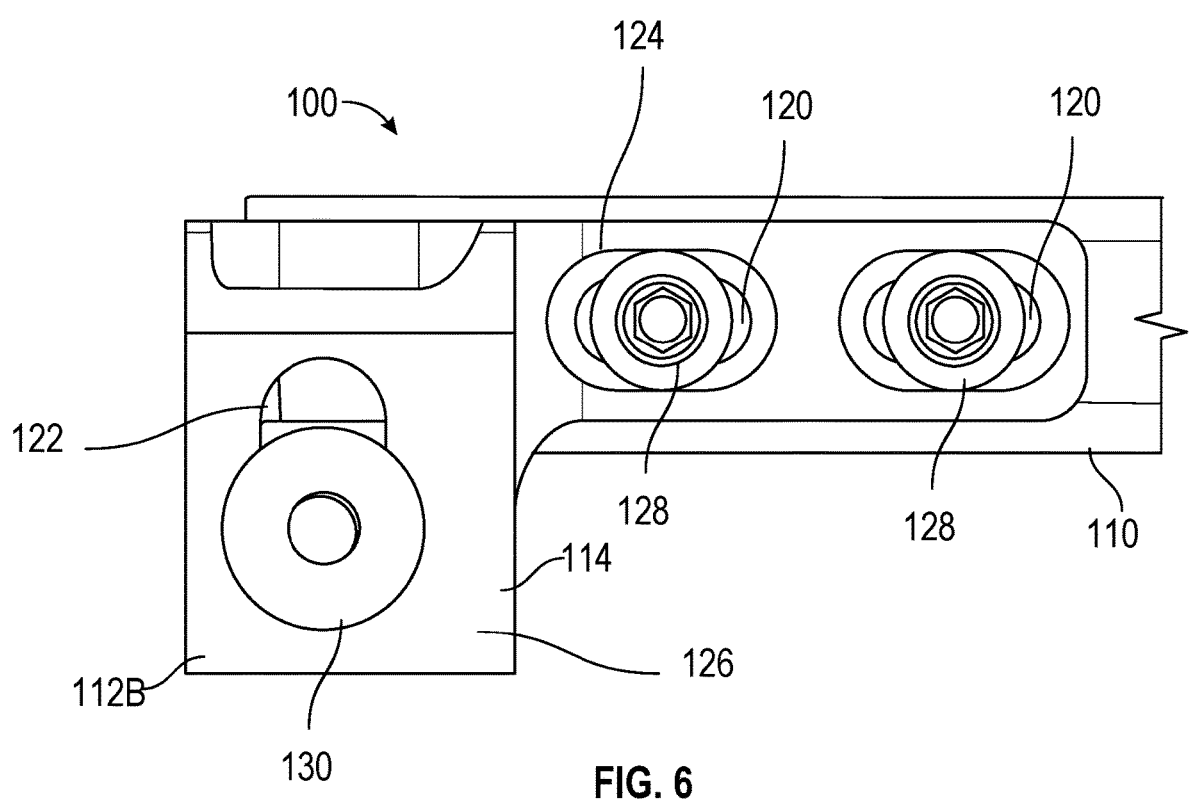
FIG. 6 is a bottom view of the other mounting assembly of FIG. 2.

The base frame 110 is connected to the track fitting assembly 115 via the one or more mounting assemblies 112. In the embodiment illustrated, the mounting system 100 includes two mounting assemblies 112A-B. As best illustrated in FIGS. 5 and 6, each mounting assembly 112 includes a mounting structure 114 having at least one first slot 120 elongated in a first direction 132 and at least one second slot 122 elongated in a second direction 134. A length of the first slot 120 may be the same as or different from a length of the second slot 122. In various embodiments, the length of the first slot 120 and the length of the second slot 122 may minimize or prevent load transfer in the first direction 132 and/or the second direction 134. In certain embodiments, the first direction 132 is side to side direction (or a lateral direction), and the second direction 134 is a forward and aft direction (or a longitudinal direction). In other embodiments, the first direction 132 and the second direction 134 may be other directions as desired, and the first direction 132 need not be orthogonal to the second direction 134.

Figure 7:
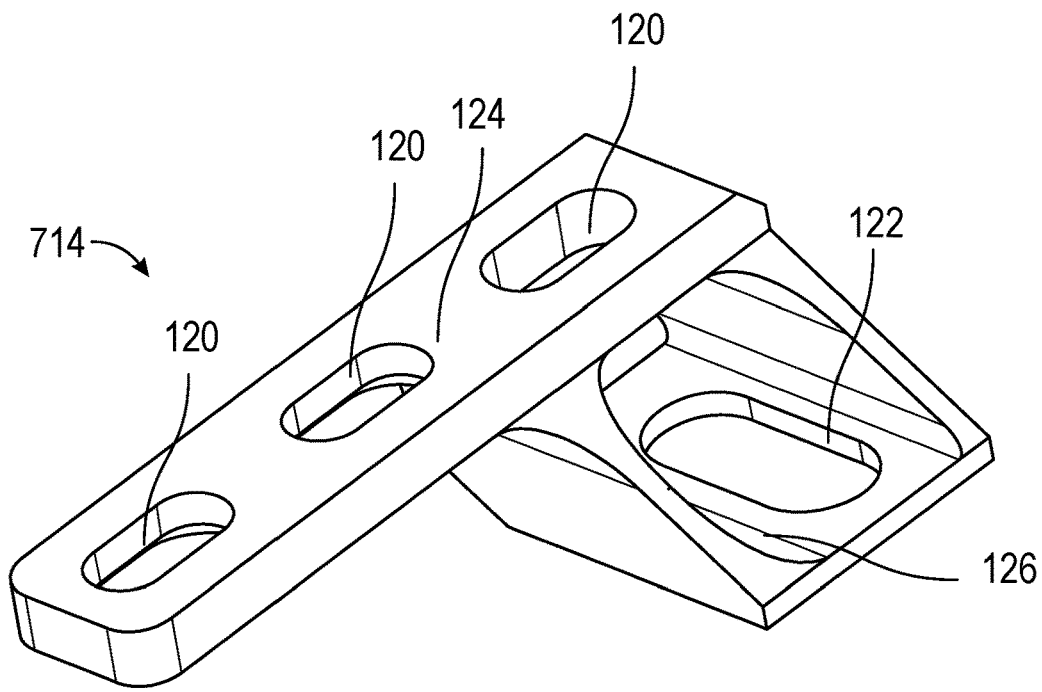
FIG. 7 is a perspective view of a mounting structure for a mounting assembly according to certain embodiments of the present invention.
Figure 8:
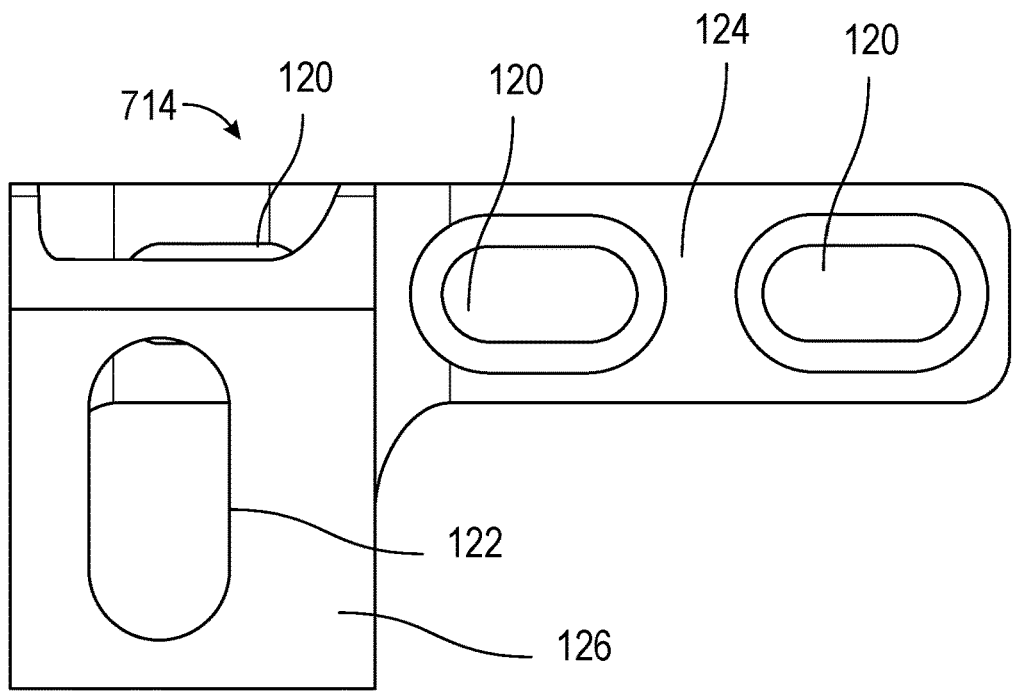
FIG. 8 is a bottom view of the mounting structure of FIG. 7.

The mounting structures 114 may include any number of first slots 120 and second slots 122 as desired, and the number of first slots 120 need not be the same as the number of second slots 122. In the embodiment illustrated in FIGS. 2-6, the mounting structures 114 include two first slots 120 and one second slot 122. FIGS. 7 and 8 illustrate an embodiment of another mounting structure 714 that includes three first slots 120 and one second slot 122. As discussed in detail below, a first connector 128 may be retained within a first slot 120 and may be movable within the first slot 120 in the first direction. Similarly, a second connector 130 may be retained within the second slot 122 and may be movable within the second slot 122 in the second direction.

The first slot(s) 120 and the second slot(s) 122 may be provided in various arrangements and configurations on the mounting structures 114 as desired. As one non-limiting example, and as illustrated in FIG. 5, the second slot 122 may be provided between two first slots 120 in the lateral direction. In other embodiments, a first slot 120 may be provided between two second slots 122 in the lateral direction. In other embodiments, a first slot 120 need not be provided between second slots 122, and vice versa. As a non-limiting example, FIG. 6 illustrates a second slot 122 that is not between the first slots 120. In other embodiments, the second slot(s) 122 may extend forward or aft relative to the first slot(s) 120 such that the first slot(s) 120 and the second slot(s) 122 are not collinear. FIGS. 5 and 6 illustrate an embodiment where the first slot(s) 120 and the second slot(s) 122 are not collinear. In other embodiments, the first slot(s) 120 and the second slot(s) 122 may be collinear. In certain embodiments, the first slot(s) 120 and the second slot(s) 122 may not be coplanar, while in other embodiments the first slot(s) 120 and the second slot(s) 122 are coplanar. FIGS. 2-6 illustrate the mounting structures 114 where the first slot(s) 120 and the second slot(s) 122 are not coplanar. In these embodiments, the mounting structures 114 may include a base 124 and a support 126 that extends from the base 124. In some embodiments, the first slot(s) 120 are defined in the base 124 and the second slot(s) 122 are defined in the support 126, or vice versa. In the embodiment illustrated in FIGS. 2-6, the support 126 extends vertically below the base 124 such that the second slot(s) 122 are vertically offset below the first slot(s) 120.

In addition to the mounting structure(s) 114, the mounting assembly 112 includes at least one first connector 128 that is positionable within the at least one first slot 120 and at least one second connector 130 that is positionable within the at least one second slot 122. In various embodiments, the first connector 128 is connected or otherwise attached to the base frame 110 and the second connector 130 is connected or otherwise attached to the track fitting assembly 115. In certain embodiments, the mounting assembly 112 includes a plurality of first connectors 128 and/or a plurality of second connectors 130, and the number of first connectors 128 need not be the same as the number of second connectors 130. The first connectors 128 and second connectors 130 may be various suitable devices or mechanisms for connecting the mounting structure 114 with the base frame 110 and the track fitting assembly 115, respectively. In the embodiment illustrated, the first connectors 128 and the second connectors 130 are bolts with bushings, although other types of connectors may be utilized. Moreover, the device or mechanism used as the first connectors 128 need not be the same as the type of device or mechanism used as the second connectors 130.

The first connectors 128 are retained within the first slots 120 such that the mounting structure 114 is connected to the base frame 110 while also being movable in the first direction 132 relative to the base frame 110. Similarly, the second connectors 130 are retained within the second slots 122 such that the mounting structure 114 is connected to the track fitting assembly 115 while also being movable in the second direction 134 relative to the track fitting assembly 115. In certain embodiments, the first connectors 128 and the second connectors 130 simultaneously movable in both the first direction 132 and the second direction 134 via the first slots 120 and the second slots 122. In various embodiments, the simultaneous movement of the first connectors 128 and the second connectors 130 may allow for the aircraft furniture to move in both the first direction 132 (via the first connectors 128) and the second direction 134 (via the second connectors 130) while allowing the furniture to remain fixed in the mounting track. In such embodiments, the mounting structure 114 may absorb movement of the aircraft furniture (via the base frame 110) in the first direction 132 and/or the second direction 134 (e.g., due to deflection of the aircraft floor) while remaining fixed to the mounting track (via the track fitting assembly 115), thereby reducing potential damage to the furniture and/or mounting track. While the mounting structure 114 allows for simultaneous movement in the first direction 132 and the second direction 134, depending on particular loading cases or events, movement may only be in one direction.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A mounting assembly for mounting an item of aircraft furniture in an aircraft, the mounting assembly comprising: a mounting structure comprising a first slot elongated in a lateral direction and a second slot elongated in a longitudinal direction, wherein the second slot is offset from the first slot; a first connector retained within the first slot and movable in the lateral direction, wherein the first connector is adapted to connect with a base frame of the item of aircraft furniture; and a second connector retained within the second slot and movable in the longitudinal direction, wherein the second connector is adapted to connect with a track fitting assembly.

Illustration 2. The mounting assembly of any preceding or subsequent illustrations or combination of illustrations, wherein the first connector is slidable within the first slot and wherein the second connector is slidable within the second slot.

Illustration 3. The mounting assembly of any preceding or subsequent illustrations or combination of illustrations, wherein the first slot is a first lateral slot and the first connector is a first base frame connector, wherein the mounting structure further comprises a second lateral slot elongated in the lateral direction, wherein the mounting assembly further comprises a second base frame connector adapted to connect to the base frame of the item of aircraft furniture, and wherein the second base frame connector is movable in the lateral direction within the second lateral slot.

Illustration 4. The mounting assembly of any preceding or subsequent illustrations or combination of illustrations, wherein the second slot is between the first lateral slot and the second lateral slot in the lateral direction.

Illustration 5. The mounting assembly of any preceding or subsequent illustrations or combination of illustrations, wherein the first slot and the second slot are non-coplanar.

Illustration 6. The mounting assembly of any preceding or subsequent illustrations or combination of illustrations, wherein the second slot is vertically offset below the first slot.

Illustration 7. The mounting assembly of any preceding or subsequent illustrations or combination of illustrations, wherein the second slot extends forward or aft relative to the first slot.

Illustration 8. The mounting assembly of any preceding or subsequent illustrations or combination of illustrations, wherein the first slot and the second slot are coplanar.

Illustration 9. The mounting assembly of any preceding or subsequent illustrations or combination of illustrations, wherein the first slot and the second slot are collinear.

Illustration 10. The mounting assembly of any preceding or subsequent illustrations or combination of illustrations, wherein a vertical position of the first connector is fixed relative to the second connector via the mounting structure.

Illustration 11. The mounting assembly of any preceding or subsequent illustrations or combination of illustrations, wherein a length of the first slot is different from a length of the second slot.

Illustration 12. The mounting assembly of any preceding or subsequent illustrations or combination of illustrations, wherein the mounting structure comprises a base and a support extending from the base in a vertical direction and offset from the base in the longitudinal direction, wherein the base defines the first slot, and wherein the support defines the second slot.

Illustration 13. The mounting assembly of any preceding or subsequent illustrations or combination of illustrations, wherein the first connector and the second connector are simultaneously movable in the longitudinal direction and the lateral direction.

Illustration 14. A mounting system comprising the mounting assembly of any preceding or subsequent illustrations or combination of illustrations, the base frame, and the track fitting assembly.

Illustration 15. The mounting system of any preceding or subsequent illustrations or combination of illustrations, wherein a vertical position of the base frame relative to the track fitting assembly is fixed.

Illustration 16. An item of aircraft furniture comprising the mounting system of any preceding or subsequent illustrations or combination of illustrations.

Illustration 17. The item of aircraft furniture of any preceding or subsequent illustrations or combination of illustrations, wherein the item of aircraft furniture comprises at least one of an aircraft seat, a table, a cabinet or stowage compartment, an aircraft interior monument, or a privacy module wall.

Illustration 18. A mounting system for mounting an item of aircraft furniture in an aircraft, the mounting system comprising: a base frame; a track fitting assembly, wherein the track fitting assembly is configured to engage a track in the aircraft; and a mounting assembly comprising: a mounting structure comprising a first slot elongated in a lateral direction and a second slot elongated in a longitudinal direction; a first connector connected to the base frame; and a second connector connected to the track fitting assembly, wherein the first connector is movable within the first slot in the lateral direction and the second connector is movable within the second slot in the longitudinal direction such that the base frame is longitudinally and laterally movable relative to the track fitting assembly.

Illustration 19. The mounting system of any preceding or subsequent illustrations or combination of illustrations, wherein the first slot is a first lateral slot and the first connector is a first base frame connector, wherein the mounting structure further comprises a second lateral slot elongated in the lateral direction, wherein the mounting assembly further comprises a second base frame connector connected to the base frame, and wherein the second base frame connector is movable in the lateral direction within the second lateral slot.

Illustration 20. The mounting system of any preceding or subsequent illustrations or combination of illustrations, wherein the first slot and the second slot are non-coplanar.

Illustration 21. A mounting structure for mounting an item of aircraft furniture in an aircraft, the mounting structure comprising: a base comprising a first slot elongated in a lateral direction, wherein the mounting structure is configured to retain a first connector connected to a base frame of the item of aircraft furniture within the first slot and such that the first connector is movable in the lateral direction; and a support extending from the base, wherein the support comprises a second slot elongated in a longitudinal direction, wherein the mounting structure is configured to retain a second connector connected to a track fitting assembly within the second slot and such that the second connector is movable in the longitudinal direction, wherein the first slot and the second slot are non-coplanar.

Illustration 22. The mounting structure of any preceding or subsequent illustrations or combination of illustrations, wherein the second slot is vertically offset below the first slot, and wherein the support extends from the base in the longitudinal direction such that the second slot is offset forward or aft from the first slot.

Illustration 23. A mounting assembly for mounting an item of aircraft furniture in an aircraft, the mounting assembly comprising: a mounting structure comprising a first slot elongated in a first direction and a second slot elongated in a second direction; a first connector within the first slot and such that the first connector is movable in the first direction, wherein the first connector is connectable to a base frame of the item of aircraft furniture; and a second connector within the second slot such that the second connector is movable in the second direction, wherein the second connector is connectable to a track fitting assembly, wherein the first connector and the second connector are simultaneously movable in the first direction and the second direction.

Illustration 24. A mounting system comprising the mounting assembly of any preceding or subsequent illustrations or combination of illustrations, the base frame, and the track fitting assembly, and wherein the first direction is a lateral direction and the second direction is a longitudinal direction.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A mounting assembly for mounting an item of aircraft furniture in an aircraft, the mounting assembly comprising:
   a mounting structure comprising a first slot elongated in a lateral direction and a second slot elongated in a longitudinal direction, wherein the second slot is vertically and horizontally offset from the first slot, wherein the first slot comprises a first axis orthogonal to a plane of the mounting structure onto which the first slot is located, wherein the first axis is centrally located within first slot, wherein the second slot comprises a second axis orthogonal to a plane of the mounting structure onto which the second slot is located, wherein the second axis is centrally located within second slot, and wherein the first axis and second axis are parallel;

a first connector retained within the first slot in a first direction and movable in the lateral direction, wherein the first connector is adapted to connect with a base frame of the item of aircraft furniture; and a second connector retained within the second slot in a second direction and movable in the longitudinal direction, wherein the second connector is adapted to connect with a track fitting assembly, and wherein the first direction is parallel with respect to the second direction; and wherein the first connector and the second connector are configured to move simultaneously in the longitudinal direction and the lateral direction when the mounting structure is fixed to a mounting track of an airplane as to absorb movement of the mounting structure while remaining fixed to the mounting track.

2. The mounting assembly of claim 1, wherein the first connector is slidable within the first slot and wherein the second connector is slidable within the second slot.

3. The mounting assembly of claim 1, wherein the first slot is a first lateral slot and the first connector is a first base frame connector, wherein the mounting structure further comprises a second lateral slot elongated in the lateral direction, wherein the mounting assembly further comprises a second base frame connector adapted to connect to the base frame of the item of aircraft furniture, and wherein the second base frame connector is movable in the lateral direction within the second lateral slot.

4. The mounting assembly of claim 3, wherein the second slot is between the first lateral slot and the second lateral slot in the lateral direction.

5. The mounting assembly of claim 1, wherein the second slot is vertically offset below the first slot.

6. The mounting assembly of claim 1, wherein the second slot extends forward or aft relative to the first slot.

7. The mounting assembly of claim 1, wherein the first slot and the second slot are collinear.

8. The mounting assembly of claim 1, wherein a vertical position of the first connector is fixed relative to the second connector via the mounting structure.

9. The mounting assembly of claim 1, wherein a length of the first slot is different from a length of the second slot.

10. The mounting assembly of claim 1, wherein the mounting structure comprises a base and a support extending from the base in a vertical direction and offset from the base in the longitudinal direction, wherein the base defines the first slot, and wherein the support defines the second slot.

11. A mounting system comprising the mounting assembly of claim 1, the base frame, and the track fitting assembly.

12. An item of aircraft furniture comprising the mounting system of claim 11, wherein the item of aircraft furniture comprises at least one of an aircraft seat, a cabinet or stowage compartment, a table, an aircraft interior monument, or a privacy module wall.

* * * * *